(12) United States Patent
Jurik et al.

(10) Patent No.: US 7,350,817 B2
(45) Date of Patent: Apr. 1, 2008

(54) STEERING COLUMN BRACKET

(75) Inventors: Mirjana Jurik, Rochester Hills, MI (US); Donald A Mahoney, Clio, MI (US); Jeffrey D Ottenhoff, Lake Orion, MI (US)

(73) Assignee: Chrysler LLC, Auburn Hills, MI (US)

( * ) Notice: Subject to any disclaimer, the term of this patent is extended or adjusted under 35 U.S.C. 154(b) by 33 days.

(21) Appl. No.: 10/769,950

(22) Filed: Feb. 2, 2004

(65) Prior Publication Data
US 2005/0167965 A1 Aug. 4, 2005

(51) Int. Cl.
*B62D 1/19* (2006.01)
*B62D 1/16* (2006.01)
(52) U.S. Cl. .................. 280/777; 280/779; 74/492
(58) Field of Classification Search ............. 280/779, 280/777; 74/492
See application file for complete search history.

(56) References Cited

U.S. PATENT DOCUMENTS

| | | | |
|---|---|---|---|
| 3,612,223 A | * 10/1971 | Shiomi et al. ............. 188/375 |
| 3,785,671 A | 1/1974 | Salewsky | |
| 4,194,411 A | * 3/1980 | Manabe et al. ............. 74/492 |
| 5,356,179 A | 10/1994 | Hildebrandt et al. | |
| 5,390,955 A | * 2/1995 | Kaliszewski et al. ...... 280/777 |
| 5,823,062 A | 10/1998 | Snell et al. | |
| 5,845,936 A | * 12/1998 | Higashino .................. 280/775 |
| 5,979,860 A | * 11/1999 | Jurik et al. .................. 248/548 |
| 6,099,038 A | 8/2000 | Jurik et al. | |
| 6,398,259 B1 | * 6/2002 | Palmer et al. ............. 280/777 |
| 6,494,488 B1 | * 12/2002 | Jurik et al. ................. 280/777 |
| 6,655,715 B2 | * 12/2003 | Anspaugh et al. ......... 280/777 |
| 6,799,780 B2 | * 10/2004 | Anspaugh et al. ......... 280/777 |
| 6,814,373 B2 | * 11/2004 | Munro et al. .............. 280/777 |
| 2002/0121771 A1 | * 9/2002 | Shifflett et al. ............. 280/779 |
| 2004/0093976 A1 | * 5/2004 | Burke et al. ................ 74/492 |

* cited by examiner

*Primary Examiner*—Ruth Ilan
*Assistant Examiner*—George D. Spisich
(74) *Attorney, Agent, or Firm*—Ralph E. Smith

(57) ABSTRACT

A steering column bracket for a motor vehicle includes a body defining a bore adapted to receive a lower mounting bracket. A pair of wings extend out from the body on opposite sides thereof. A bracing is formed on at least a portion of a surface of the body and a at least a portion of a surface of the wings. The bracing includes of a plurality of ribs defining pockets. The bracing provides stiffness to the steering column bracket.

8 Claims, 4 Drawing Sheets

STEERING COLUMN BRACKET

FIELD OF THE INVENTION

The present invention relates to a steering column bracket and, more particularly, to a one piece steering column bracket having increased stiffness and vibration absorption properties.

BACKGROUND OF THE INVENTION

Steering column brackets are known in the art and are generally used to support a lower mounting bracket that extends from the steering wheel of a motor vehicle to the steering assembly. The steering column bracket is mounted to the instrument panel of the motor vehicle. As the point of support for the steering assembly of the motor vehicle, the steering column bracket is subjected to vibrations from the wheels of the motor vehicle that are transmitted through the lower mounting bracket. In this regard, steering column brackets must be able to absorb vibrations that are transmitted thereto. Moreover, the steering column bracket, in the event of an impact, must be able to absorb energy from the impact.

Steering column brackets have addressed these various issues in very effective ways. However, automobile manufacturers are continuously seeking to improve vibration absorption features of their automobiles. Accordingly, the present invention improves the conventional steering column bracket by increasing stiffness and increasing the absorption of vibration.

SUMMARY OF THE INVENTION

A steering column bracket for a motor vehicle includes a body defining a bore adapted to receive a lower mounting bracket. A pair of wings extend out from the body on opposite sides thereof. A bracing is formed on at least a portion of a surface of the body and on at least a portion of a surface of the wings. The bracing includes of a plurality of ribs defining pockets. The bracing provides stiffness to the steering column bracket.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
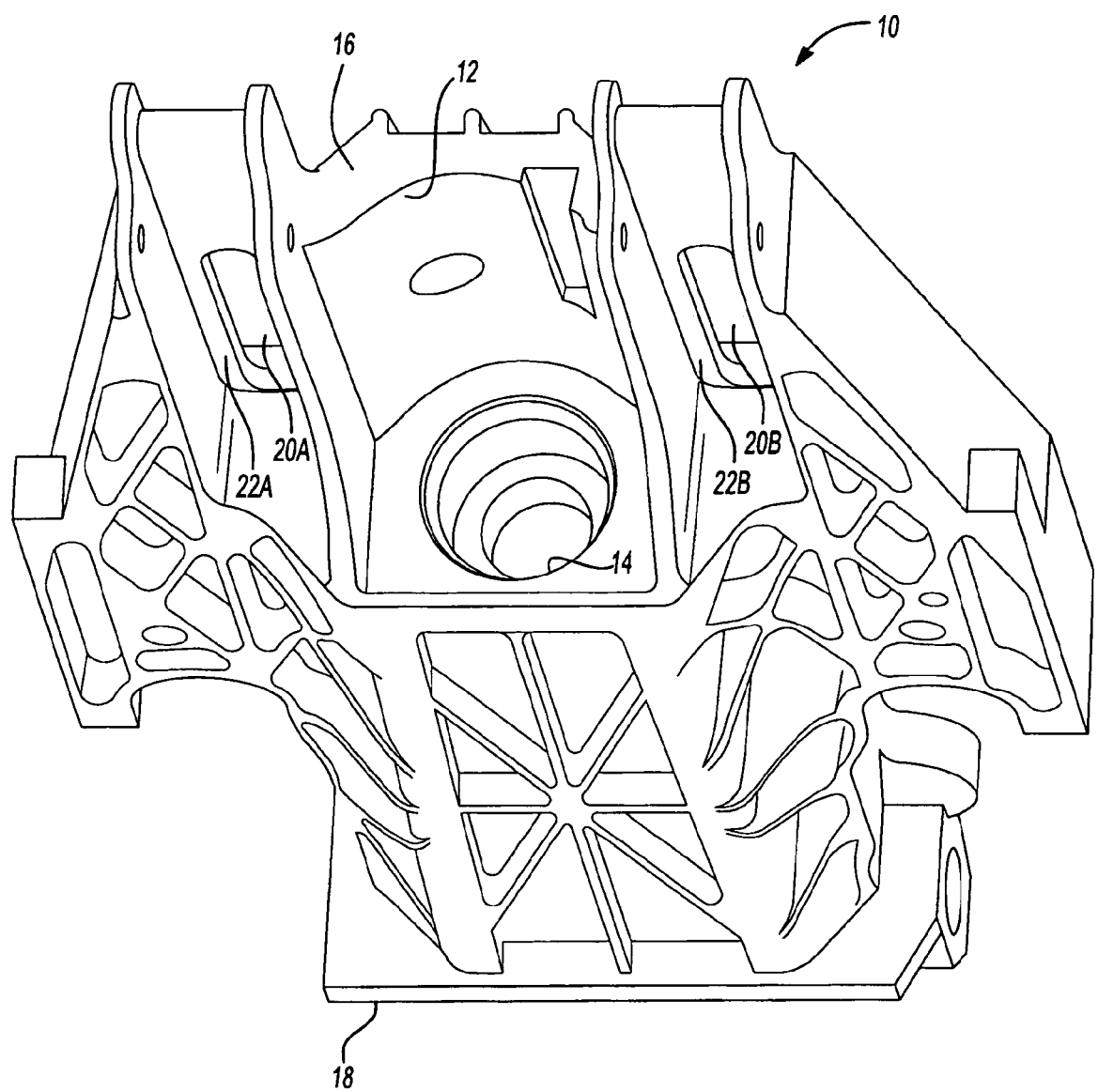
FIG. 1 is a front and bottom isometric view of a steering column bracket constructed according to the principles of the present invention.

With reference to FIG. 1, there is illustrated a steering column bracket constructed according to the principles of the present invention and generally indicated by reference numeral 10. The steering column bracket 10 includes a body 12 that defines a bore 14. The bore 14 is sized to receive steering shaft (rod) connection to steering gear (not shown). The bore 14 extends from a first end 16 of the body 12 to a second end 18 of the body 12. The bore 14 supports the steering shaft (not shown) while allowing the steering shaft to rotate therein.

Figure 2:
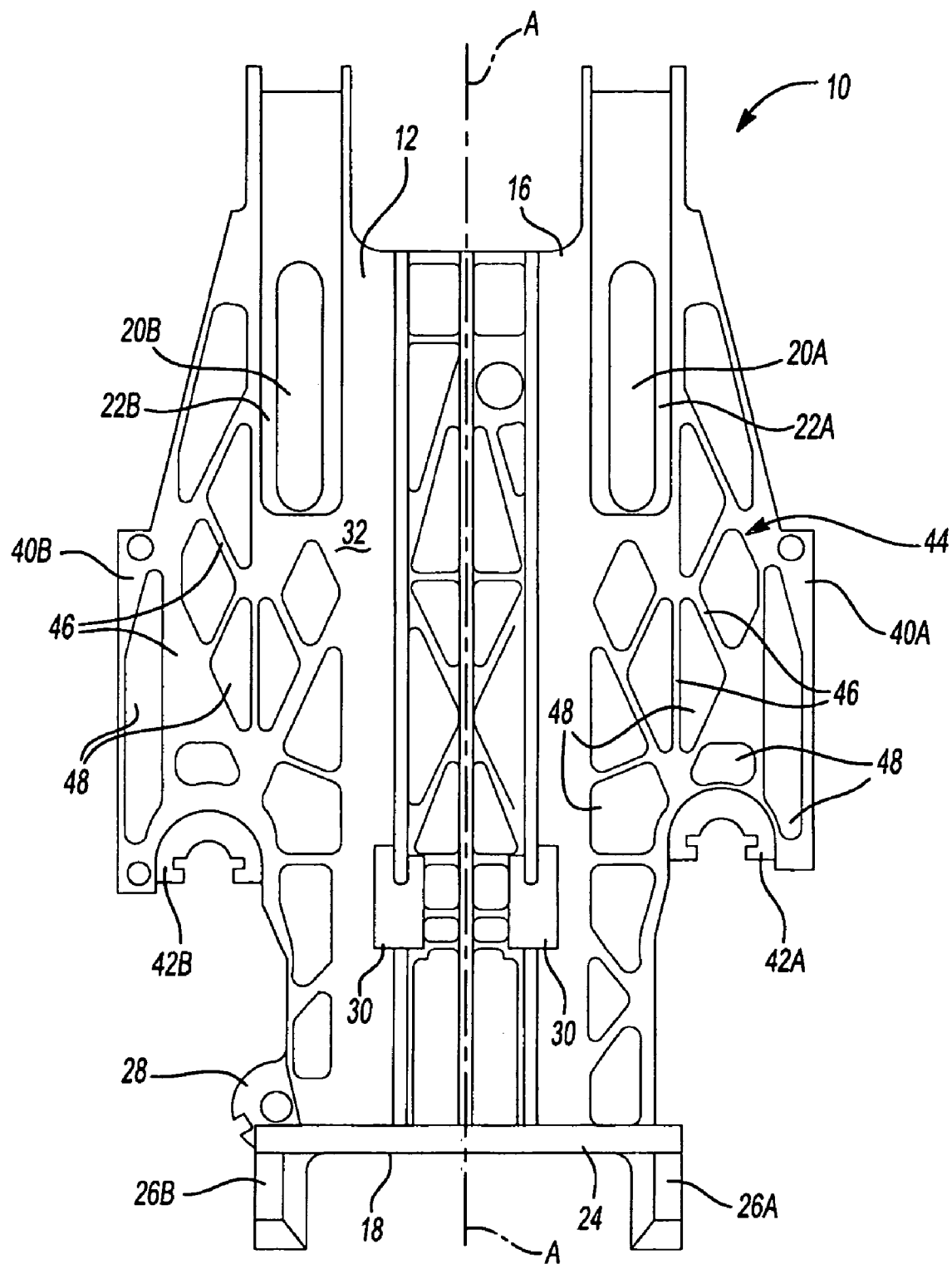
FIG. 2 is a top view of the steering column bracket of the present invention.

With reference to FIG. 2, the body 12 further includes a first slot 20A and a second slot 20B formed near the first end 16. Recessed portions 22A, 22B are formed in the body 12 and surround each of the slots 20A, 20B. The recessed portions 22A, 22B have a smooth finished surface. The first and second slots 20A, 20B and the recesses 22A, 22B form part of an energy management system (not shown) used to absorb the energy of an impact event.

The body 12 further includes a mounting flange 24 formed on the second end 18. The mounting flange 24 includes an opening (not shown) to the bore 14. A pair of pivot points 26A and 26B extend out from the mounting flange 24. The pivot points 26A, 26B are adapted to receive the wheel mounts (not shown) of a steering wheel (not shown).

The body 12 also includes a mounting point 28 formed on a side thereof proximate to pivot point 26B. The mounting point 28 is adapted to receive a tilt lever mechanism (not shown) used to adjust the height of the steering tilt head (cone not shown) relative to an instrument panel (not shown) of a motor vehicle. A second mounting point 30 is formed on a top surface 32 of the body 12. The second mounting point 30 is adapted to receive a tilt mechanism (not shown) used to adjust the height of the steering tilt head (not shown) in response to activation of the tilt lever mechanism (not shown).

The steering column bracket 10 further includes a first wing flange 40A and a second wing flange 40B extending from the sides of the body 12. Each wing flange 40A, 40B extends from near the slots 22A, 22B to near the second mounting point 30. The wing flanges 40A, 40B are planar with the top surface 32 of the body 12. Each wing flange 40A, 40B includes quick release points 42A and 42B that are adapted to receive quick release capsules (not shown) for mounting the steering column bracket 10 to the body (not shown) of a motor vehicle. The quick release capsules are designed to decouple from the steering column bracket 10 in the event of an impact.

Figure 3:
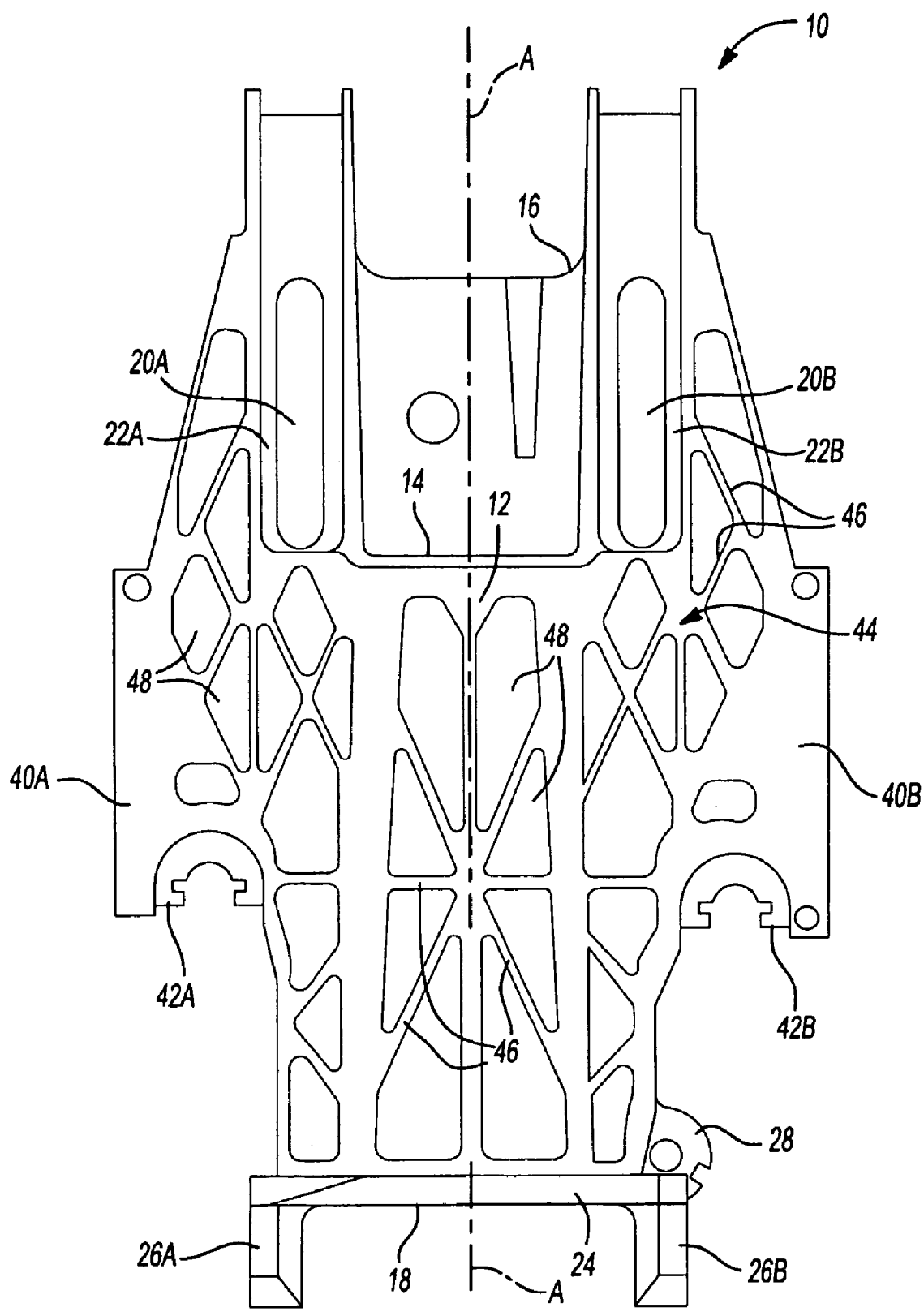
FIG. 3 is a bottom view of the steering column bracket of the present invention.
Figure 4:
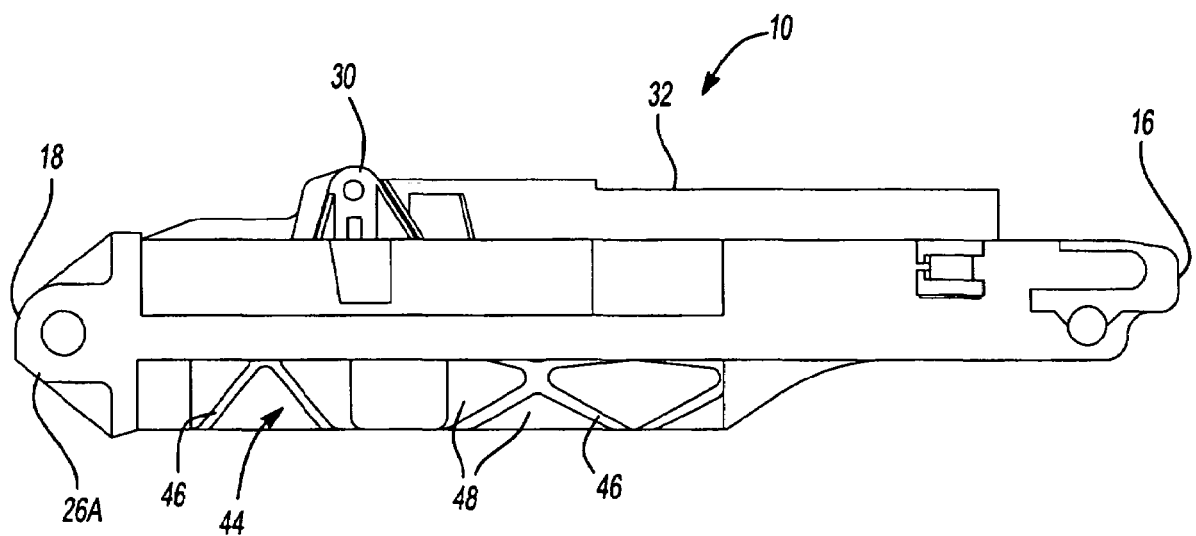
FIG. 4 is a side view of the steering column bracket of the present invention.

With reference to FIGS. 1-4, the steering column bracket 10 further includes bracing 44 formed on the surfaces of the body 12 and the wing flanges 40A, 40B. The bracing 44 extends across the top surface 32 of the body 12, across the bottom surface of the body 12, and on both sides of the wing flanges 40A, 40B. It should be appreciated however that the bracing 44 may only partially cover the body 12 and the wing flanges 40A, 40B without departing from the scope of the invention. The bracing 44 includes a plurality of ribs 46 that define pockets 48. As best seen in FIGS. 2 and 3, the ribs 46 tend to run obliquely to an axis A-A of the bore 14. The ribs 46 provide stiffness to the steering column bracket 10 and absorb high frequencies of vibration.

The steering column bracket 10 is preferably made from magnesium or aluminum and is cast as a single piece unitary structure which also serves to increase the stiffness of the steering column bracket 10. Alternatively, various other materials may be used for the steering column bracket 10. In this regard, the body 12, the wing flanges 40A, 40B and the bracing 44 are all formed of the same piece and material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering column bracket for a motor vehicle comprising:
    a body defining a bore, said bore having a longitudinal axis extending along a length thereof;
    a first mounting arrangement formed in said body and including first and second recessed portions disposed on a oppsite sides of said bore;
    a second mounting arrangement for attaching said body to the motor vehicle, said second mounting arrangement spaced apart from said first mounting arrangement;
    a pair of wings each having a thickness defined by a top surface and a bottom surface, said pair of wings extending out from said body on opposite sides of said bore and between said first mounting arrangement and said second mounting arrangement; and
    a bracing formed on each of said top surface and said bottom surface of said pair of wings and including a plurality of ribs defining a plurality of pockets that extend between said first mounting arrangement and said second mounting arrangement, said ribs disposed adjacent to said bore and extending obliquely to said longitudinal axis to provide stiffness to the steering column bracket.

2. The steering column bracket of claim 1, wherein said wings extend substantially co-planar to a top surface of said body.

3. The steering column bracket of claim 1, wherein said wings each include a notch receiving a quick release capsule.

4. The steering column bracket of claim 1, wherein said body, said wings, and said bracing are formed from aluminum.

5. The steering column bracket of claim 1, wherein said body, said wings, and said bracing are formed from magnesium.

6. The steering column bracket of claim 1, wherein said body, said wings, and said bracing are integrally formed.

7. The steering column bracket of claim 1, wherein said body, said wings, and said bracing are formed of a single piece of metal such that said body is continuous with said wings and said bracing.

8. The steering column bracket of claim 1, wherein said bracing extends at least partially onto a surface of said body.

* * * * *